(12) United States Patent
Cosgrove et al.

(10) Patent No.: US 7,207,620 B2
(45) Date of Patent: Apr. 24, 2007

(54) AERODYNAMIC DRAG REDUCING SYSTEM WITH RETROFITTABLE, SELECTIVELY REMOVABLE FRAME

(76) Inventors: William E. Cosgrove, 3747 Prospector Cir., Salt Lake City, UT (US) 84121; Timothy C. Cosgrove, 3747 Prospector Cir., Salt Lake City, UT (US) 84121

( * ) Notice: Subject to any disclaimer, the term of this patent is extended or adjusted under 35 U.S.C. 154(b) by 0 days.

(21) Appl. No.: 11/209,325

(22) Filed: Aug. 23, 2005

(65) Prior Publication Data
US 2007/0046066 A1 Mar. 1, 2007

(51) Int. Cl.
*B60J 1/00* (2006.01)
(52) U.S. Cl. .................................................. 296/180.4
(58) Field of Classification Search ............ 296/180.4, 296/180.1; 180/903; 105/1.1
See application file for complete search history.

(56) References Cited

U.S. PATENT DOCUMENTS

| | | | |
|---|---|---|---|
| 2,737,411 A * | 3/1956 | Potter | 296/180.4 |
| 4,006,932 A | 2/1977 | McDonald | |
| 4,142,755 A * | 3/1979 | Keedy | 296/180.4 |
| 4,214,787 A | 7/1980 | Chain | |
| 4,257,641 A * | 3/1981 | Keedy | 296/180.4 |
| 4,360,232 A | 11/1982 | Elder | |
| 4,401,339 A | 8/1983 | Rios | |
| 4,451,074 A * | 5/1984 | Scanlon | 296/180.4 |
| 4,458,936 A * | 7/1984 | Mulholland | 296/180.4 |
| 4,508,380 A | 4/1985 | Sankrithi | |
| 4,601,508 A | 7/1986 | Kerian | |
| 4,629,241 A | 12/1986 | Gruich | |
| 4,682,808 A | 7/1987 | Bilanin | |
| 4,702,509 A | 10/1987 | Elliott, Sr | |
| 4,741,569 A * | 5/1988 | Sutphen | 296/180.4 |
| 4,750,772 A | 6/1988 | Haegert | |
| 4,818,015 A * | 4/1989 | Scanlon | 296/180.4 |
| 4,978,162 A * | 12/1990 | Labbe | 296/180.4 |
| 5,000,508 A | 3/1991 | Woods | |
| 5,058,945 A | 10/1991 | Elliott, Sr. et al. | |
| 5,240,306 A | 8/1993 | Flemming | |
| 5,280,990 A | 1/1994 | Rinard | |
| 5,348,366 A | 9/1994 | Baker et al. | |
| 5,374,013 A | 12/1994 | Bassett et al. | |
| 5,375,903 A | 12/1994 | Lechner | |
| 5,498,059 A * | 3/1996 | Switlik | 296/180.4 |
| 5,609,384 A | 3/1997 | Loewen | |
| 5,823,610 A | 10/1998 | Ryan et al. | |
| 5,921,617 A | 7/1999 | Loewen et al. | |
| 5,941,595 A | 8/1999 | Schroeder et al. | |
| 5,947,548 A | 9/1999 | Carper et al. | |

(Continued)

*Primary Examiner*—Kiran B. Patel
(74) *Attorney, Agent, or Firm*—Workman Nydegger

(57) ABSTRACT

The present invention relates to an aerodynamic drag reducing system for land vehicles, in particular semi-tractor trailers. The drag reducing system includes a selectively removable frame and a drag reduction member. The selectively removable frame can adapt to conform to at least one of the width or height of the land vehicle, and can be secured thereto by a securement assembly. In one embodiment, the drag reducing system can be folded and collapsed for compact storage. The drag reducing system can be easily and quickly secured to the back end of a semi-tractor trailer without tools and without requiring that any permanent modifications be made to the trailer. In one embodiment, drag reducing system includes a hinge joint assembly to facilitate installation, removal, and repositioning of drag reducing system.

10 Claims, 10 Drawing Sheets

U.S. PATENT DOCUMENTS

| | | | |
|---|---|---|---|
| 6,092,861 A * | 7/2000 | Whelan | 296/180.4 |
| 6,257,654 B1 | 7/2001 | Boivin et al. | |
| 6,286,894 B1 | 9/2001 | Kingham | |
| 6,309,010 B1 * | 10/2001 | Whitten | 296/180.4 |
| 6,409,252 B1 * | 6/2002 | Andrus | 296/180.4 |
| 6,457,766 B1 * | 10/2002 | Telnack | 296/180.4 |
| 6,467,833 B1 | 10/2002 | Travers | |
| 6,485,087 B1 | 11/2002 | Roberge et al. | |
| 6,561,575 B2 | 5/2003 | Fairburn et al. | |
| 6,666,498 B1 * | 12/2003 | Whitten | 296/180.4 |
| 6,692,066 B2 | 2/2004 | Fairburn et al. | |
| 6,742,616 B2 * | 6/2004 | Leban | 296/180.4 |
| 6,789,839 B1 | 9/2004 | Samuelson | |
| 6,799,791 B2 * | 10/2004 | Reiman et al. | 296/180.4 |
| 6,854,788 B1 | 2/2005 | Graham | |
| 7,055,890 B1 * | 6/2006 | Crean | 296/180.1 |

* cited by examiner

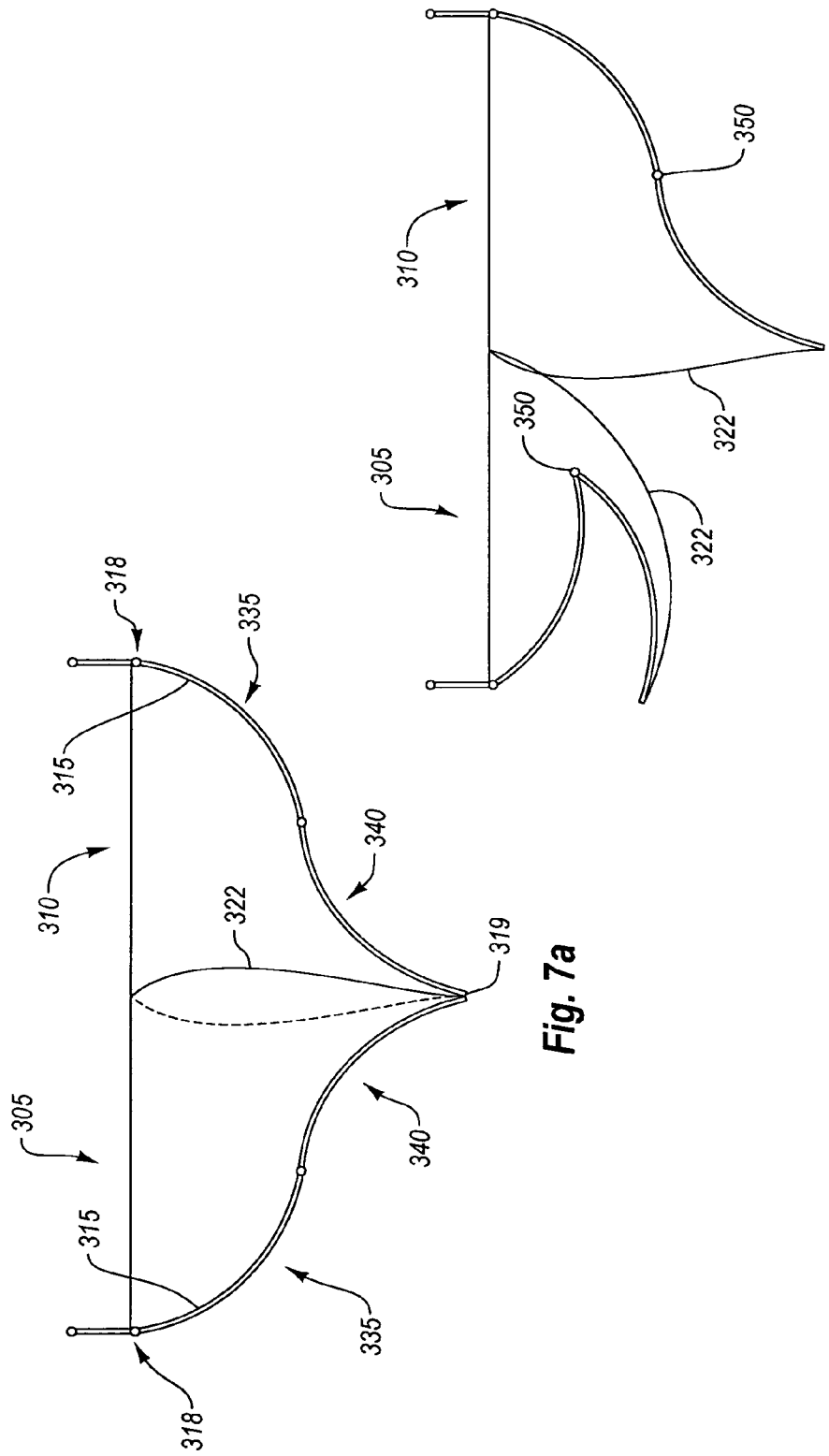

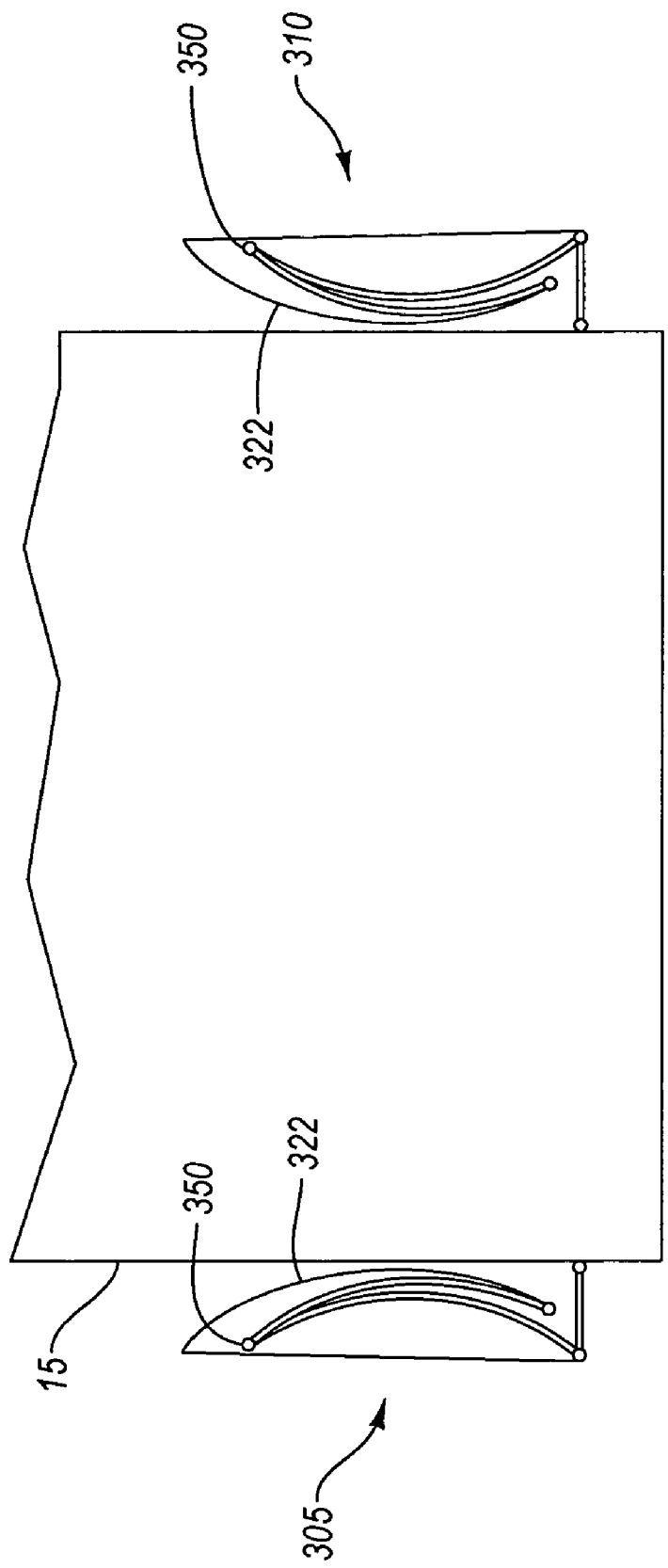

AERODYNAMIC DRAG REDUCING SYSTEM WITH RETROFITTABLE, SELECTIVELY REMOVABLE FRAME

BACKGROUND OF THE INVENTION

1. The Field of the Invention

The present invention relates to an aerodynamic drag reduction system for use on trucks and trailers. More specifically, the invention relates to a drag reducing, aerodynamic fairing that can be quickly and temporarily attached to the rear of a trailer to reduce aerodynamic drag.

2. Background and Relevant Technology

The design of a moving vehicle has always been viewed, at least in part, as both cosmetic and utilitarian. Cosmetic-based design features are based primarily on enhancing the appeal of a vehicle to the consuming public. Utilitarian-based features, on the other hand, are based on what the vehicle must have to be effective for its intended purpose. For example, the engine and vehicle size are determined, in part, by how many passengers the vehicle should carry, or what size load must be transported.

In recent years, utilitarian and cosmetic concerns have merged to increase focus on preserving cosmetic appeal, while also making the vehicles more efficient so as to reduce fuel costs. As a result, the designs of many moving vehicles have undergone significant changes, in both shape and design, so as to make the vehicles more aerodynamic.

In the United States trucking industry, an estimated 1.7 million tractors carry an estimated 4.5 million commercial trailers and consume approximately 23 billion gallons of diesel fuel each year. When traveling at highway speeds, approximately 65–70% of the energy generated from the fuel is used solely to overcome aerodynamic drag on the tractor and trailer. Many aerodynamic improvements have been made to the front sides of trailers and tractors to combat costly aerodynamic drag. The addition of streamlined fairings and other aerodynamic features has, over the past two decades, helped to increase the fuel economy of a tractor and trailer from about 4.5 miles per gallon to approximately 6 miles per gallon.

While these aerodynamic design improvements at the front of the tractor and trailer have resulted in some improvement to fuel economy, aerodynamic drag continues to be a costly problem. This problem continues, in part, because of the design of the back end of the trailer. The design of the back end of the trailer has not improved significantly over the past twenty-five years, and the back end of most trailers is still squared-off. This squared-off, back end hinders aerodynamic flow around the trailer, and still creates significant drag on the vehicle which results in the consumption of large amounts of fuel.

As with any vehicle, when the trailer body moves through the air, a mass of air is displaced and must flow around the vehicle. As the air flows toward the squared-off, back end of a semi-tractor trailer, areas of low-pressure are created. These areas cause sudden, high-energy, chaotic inrushings of turbulent air which creates drag. An aerodynamic shape extending out from the rear of a semi-tractor trailer helps control, slow, and shape the flow of inrushing air, thus decreasing the drag forces.

While many solutions to improve the aerodynamic drag at the rear of the semi-tractor trailer have been suggested, none have been widely adopted by truckers or trailer companies. Various reasons exist for this. First, semi-tractor trailers are not generally designed for aerodynamic efficiency. The trailers are designed to maximize interior space for carrying cargo, and the external dimensions of the trailer are set by state and federal highway limitations. Second, semi-tractor trailers are often loaded and unloaded at a loading dock. In order to use a loading dock, it is necessary to back the trailer up so that it is flush against the dock. This requires the trailer's back end to be planar. Therefore, any aerodynamic device secured to the distal end of a semi-tractor trailer must be easily removable or repositionable to accommodate loading and unloading at a dock. Further, the person with the highest degree of interest in aerodynamic improvements to semi-tractor trailers is the one paying for the fuel required to pull the trailer. In many cases, the owner of the trailer is not the person paying for the fuel. As a result, the owner has little interest in ensuring that the trailer is aerodynamically designed for improved fuel efficiency.

BRIEF SUMMARY OF THE INVENTION

The present invention relates to an aerodynamic drag reducing system for land vehicles. The aerodynamic drag reducing system comprises a selectively removable frame, a securement assembly, a drag reduction member and a connecting assembly. The securement assembly couples the selectively removable frame to the land vehicle. The connecting assembly couples the drag reduction member to the selectively removable frame.

Aerodynamic drag reducing systems known in the art have been not been met with much commercial or practical success. Significant drawbacks of aerodynamic drag reducing systems known in the art include: (i) the complicated and time consuming process of securing the system to the vehicle; (ii) the need to permanently modify the vehicle to which the system is secured; and (iii) the problems the system can pose for the functions of the vehicle, such as loading and unloading a semi-tractor trailer to which the system is secured.

In one exemplary embodiment of the invention, the securement of the aerodynamic drag reducing system can be quickly and easily performed by one person. This can be accomplished through the use of light weight materials and a simple securement assembly that does not require more than one person to operate. This is a significant improvement over prior art, particularly if the user of this invention (for example, the driver of a semi-tractor) works alone, and will be required to secure any drag reducing system by himself or herself.

In another exemplary embodiment of the invention, the aerodynamic drag reducing system can be secured to a land vehicle without requiring or making any permanent modifications to the vehicle. This can be accomplished through a mechanism which alters the size of the selectively removable frame. To secure the frame to the vehicle, the size of the frame is altered to fit tightly against the vehicle, such that the tight, frictional fit holds the selectively removable frame in place. The frictional fit created in this embodiment avoids the need to drill holes in or make any other permanent modifications to the vehicle. This is a significant improvement over prior art, particularly where used with semi-tractor trailers. Often, the person or entity who owns the semi-tractor trailer is not concerned about the gas efficiency of the tractor pulling the trailer, and would not realize a benefit from use of a drag reduction system. As such, the owner of the trailer may protest to any permanent modification to his or her trailer.

In another embodiment of the present invention, the aerodynamic drag reducing system can be easily removed from the land vehicle and collapsed for compact storage. This is accomplished through the use of hinges and foldable materials.

These and other objects and features of the present invention will become more fully apparent from the following description and appended claims, or may be learned by the practice of the invention as set forth hereinafter.

BRIEF DESCRIPTION OF THE DRAWINGS

To further clarify the above descriptions as well as other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 7a is a top view illustrating a drag reduction member in operation when used to reduce drag on a semi-tractor trailer, according to one embodiment of the present invention.

FIG. 7b is a top view of a partially collapsed drag reduction member according to one embodiment of the present invention.

FIG. 7c is a top view illustrating a drag reduction fairing fully collapsed and rotated forward to expose the rear of the trailer.

DETAILED DESCRIPTION OF THE PREFERRED EMBODIMENTS

The present invention relates to a drag reduction system which can quickly and easily be retrofitted to operate with a land vehicle. The drag reduction system is designed to reduce the aerodynamic drag created by land vehicles, thus increasing vehicle efficiency, and thereby reducing fuel costs. Unlike other drag reduction systems, this invention can be easily and quickly secured to a land vehicle by one person. Additionally, the drag reduction system of the present invention can be secured to a vehicle without permanently modifying the vehicle, thereby making the drag reduction system retrofittable. Finally, the aerodynamic drag reduction system, when not in use, can be selectively collapsed, such that the entire system can be effectively stored in a confined space.

Figure 1:
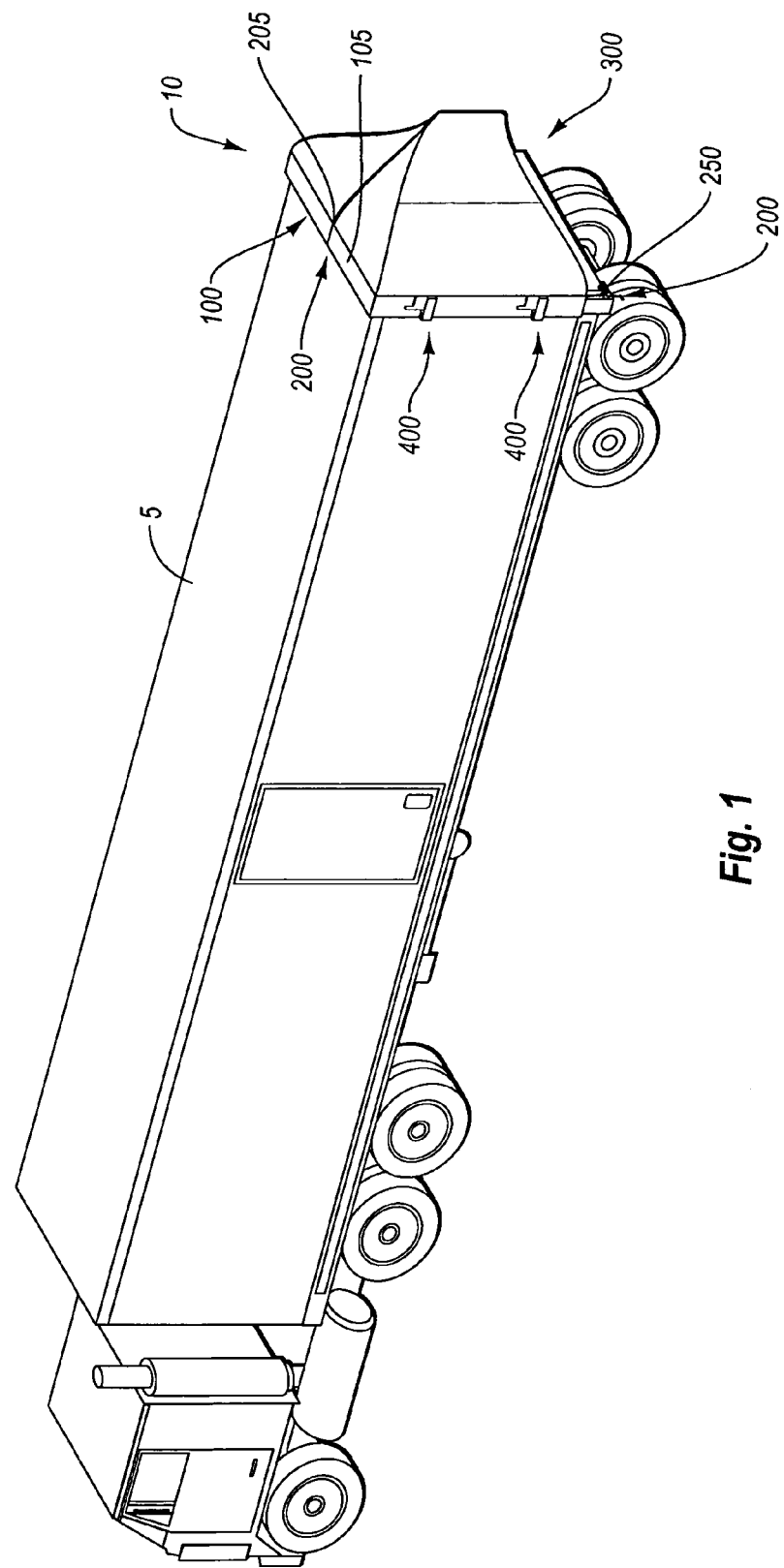
FIG. 1 is perspective view illustrating an aerodynamic drag reducing system in connection with a land vehicle, according to one embodiment of the present invention.

FIG. 1 illustrates an exemplary embodiment of an aerodynamic drag reducing system 10 as it may be used to reduce drag on a land vehicle 5. In the illustrated embodiment, drag reducing system 10 includes a selectively removable frame 100 which is coupled to a drag reduction member 300. Coupling selectively removable frame 100 to drag reduction member 300 provides numerous advantages. For example, selectively removable frame 100 and drag reduction member 300 may create a more aerodynamic back-end on a land vehicle, such that when drag reducing system 10 is secured thereto, the drag on land vehicle 5 is decreased. Additionally, selectively removable frame 100 and drag reduction member 300 may be removably coupled, thereby facilitating easy storage of drag reducing system 10 when not in use.

In the illustrated embodiment, selectively removable frame 100 includes a plurality frame members 105. In this embodiment, the plurality of frame members 105 is configured, in part, to fit around land vehicle 5. In this manner, the selectively removable frame 100 is configured to facilitate securement of selectively removable frame 100 to land vehicle 5. Additionally, selectively removable frame 100 is further coupled to drag reduction member 300. As will be discussed in more detail hereinafter, connecting assembly 400 can be utilized to selectively couple reduction member 300 to selectively removable frame 100. Accordingly, connecting assembly 400 can also secure drag reduction member 300 to land vehicle 5.

As is later discussed in more detail, drag reduction member 300 can be configured to improve the aerodynamics of land vehicle 5. For example, drag reduction member 300 can be shaped to improve a drag coefficient by using rounded and tapered edges. In one embodiment, drag reduction member 300 is shaped so as to reduce the aerodynamic impact of a substantially squared-off end of land vehicle 5.

As noted, drag reduction member 300 may be connected to selectively removable frame 100 and/or land vehicle 5 by means of connecting assembly 400. In one embodiment, connecting assembly 400 is selectively removable. In this manner, drag reduction member 300 may be selectively removed from selectively removable frame 100. As will be discussed in more detail, one embodiment of the present invention contemplates the use of corresponding pins and holes to form, in part, connecting assembly 400.

There are numerous advantages to configuring connecting assembly 400 such that drag reducing system 10 can be separated into components. For example, the separation of the components of drag reducing system 10 results in an increased ease of installation. This ease of installation can result, in part, from a reduced load which an installer must bear at any given time. For instance, the installer can install selectively frame 100 by supporting the weight of selectively removable frame 100. At a later time, installer can position and secure drag reduction member 300 to selectively removable frame 100 while only supporting the weight of drag reduction member 300. Further, selective securement of drag reduction member 300 to selectively removable frame 100 allows for an increased ease in storing drag reduction system 10. Because drag reducing system 10 can be broken down, a smaller area can be used for storage.

With continued reference to FIG. 1, drag reducing system 10 can further include a securement assembly 200. Securement assembly 200 is configured to secure at least one of selectively removable frame 100 and drag reduction member 300 to land vehicle 5. In this embodiment, securement assembly comprises an adjustment assembly 205 and a securing mechanism 250. Adjustment assembly 205 and securing mechanism 250 are, in some embodiments, adapted to adjust horizontal and/or vertical frame members 105. For example, at least a portion of adjustment assembly 205 can be attached to or integrally formed in at least one horizontal frame member 110. A feature of adjustable horizontal frame member 110 is that the width of selectively removable frame 100 can be positively or negatively adjusted. As a result, drag reducing system 10 can be adapted to fit land vehicles of any of various widths. Also, adjustment assembly 205 can allow adjustment of one or more vertical frame members 115, 120. In this manner, drag reducing system 10 can be adapted to fit land vehicles of varying heights.

In an exemplary implementation of the invention, securing mechanism 250 secures at least one of selectively removable frame 100 and drag reduction member 300 to land vehicle 5. For example, securing mechanism 250 may facilitate adjustment of adjustment assembly 205 so as to conform drag reducing system 10 to the shape of land vehicle 5. In this manner, securing mechanism 250 can adjust to create a tight, frictional fit between land vehicle 5 and removable frame 100. An advantage of a frictional fit is that selectively removable frame 100 can be removably coupled to land vehicle 5 without permanently modifying land vehicle 5. Instead, selectively removable frame 100 and drag reducing system 10 can conform to the shape of land vehicle 5. In this manner, selectively removable frame 100 and drag reducing system 10 are retrofittable.

As discussed in more detail hereinafter, once drag reducing system 10 is secured to land vehicle 5, it is desirable to maintain the position of drag reducing system 10 and to prevent drag reducing system 10 from accidentally falling off land vehicle 5. To prevent selectively removable frame 100 from expanding or otherwise being loosened from land vehicle 5, one implementation of the invention may further include a biasing mechanism to prevent undesired adjustments to adjustment assembly 205. For example, securing mechanism 250 may be adapted to selectively adjust adjustment assembly 205, while also being adapted to substantially reduce the risk of undesired adjustments to adjustment assembly 205. For example, securing mechanism 250 may include a ratchet which retracts at least a portion of selectively removable frame 100 to create and maintain a frictional fit.

Figure 2:
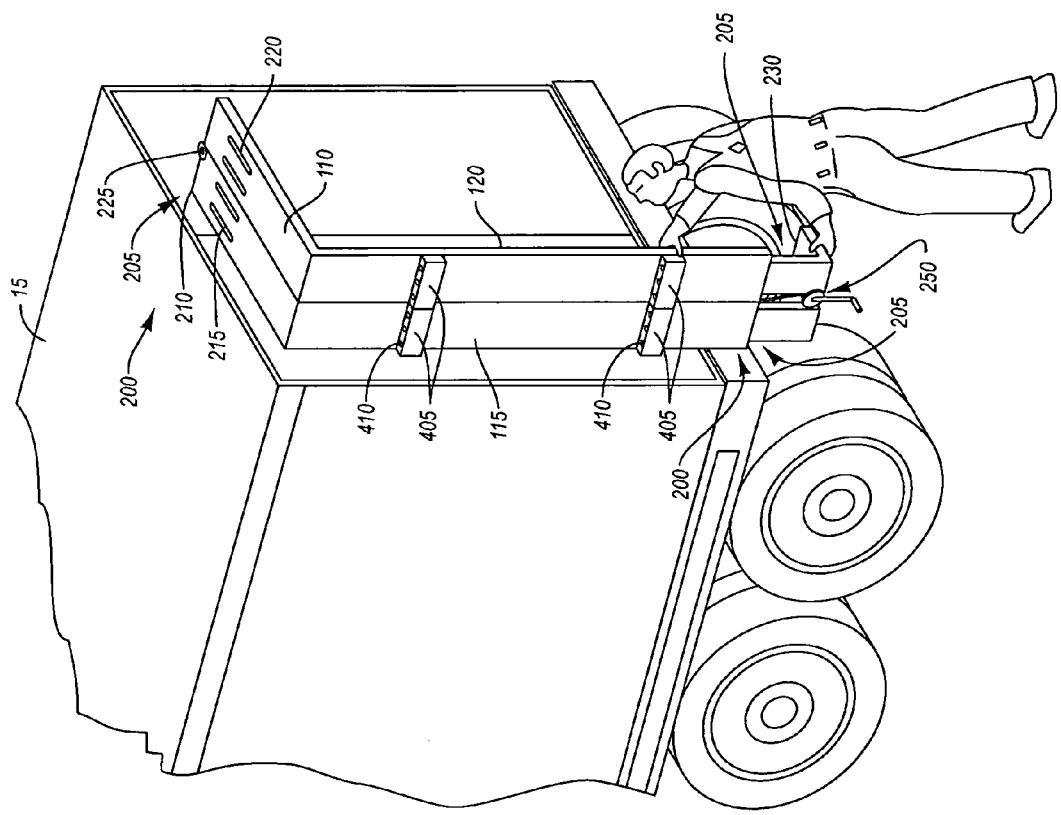
FIG. 2 is a perspective view illustrating installation of a selectively removable frame according to one embodiment of the present invention.

FIG. 2 illustrates an exemplary embodiment of selectively removable frame 100 as it can be used with and installed on a semi-tractor trailer 15. In the illustrated embodiment, selectively removable frame 100 includes at least three frame members—a horizontal frame member 110, a first vertical frame member 115, and a second vertical frame member 120. Utilizing horizontal frame member 110 with vertical frame members 115, 120 has various advantages. For example, semi-tractor trailers are frequently generally rectangular in shape. As a result, horizontal frame member 110 and vertical frame members 115, 120 allow drag reducing system 10 and selectively removable frame 100 to be adapted to mate with a large percentage of semi-tractor trailers that are currently in use. It will be appreciated by a person of ordinary skill in the art, however, that a variety of configurations of selectively removable frame 100 are within the scope of the present invention. For example, more or less than three frame members may be used, as needed to adjust to semi-tractor trailer 15.

In the illustrated embodiment, semi-tractor trailer 15 has a substantially rectangular back-end. Accordingly, selectively removable frame 100 includes horizontal frame member 110 and vertical frame members 115, 120 which are coupled to and extend substantially perpendicular from horizontal frame member 110. In this manner, when drag reducing system 10 is secured to semi-tractor trailer 15, horizontal frame member 110 is positioned on the top surface of semi-tractor trailer 15, and vertical frame members 115, 120 extend along the sides of semi-tractor trailer 15. In the illustrated embodiment, vertical frame members 115, 120 extend to a level short of the bottom edge of semi-tractor trailer 15. Shortened vertical frame members 115, 120 are desirable for various reasons. For example, shorter lengths require less material such that the weight of drag reducing system 10 can be reduced to make it easier for a single person to install and handle. Additionally, in some embodiments, drag reducing system 10 may include adjustment assembly 205 such as that illustrated in FIG. 4. In these exemplary embodiments, adjustment assembly 205 can include additional components adding vertical length so as to extend the full length of the sides of semi-tractor trailer 15. As will be appreciated by a person having ordinary skill in the art, features and configurations other than those in the illustrated embodiment are within the scope of this invention. For instance, it is not necessary, in all embodiments, that frame member 110 be horizontal, or that frame members 115 and 120 be vertical and/or perpendicular to frame member 110. Instead, the frame members may be configured to adapt to other shaped semi-tractor trailers. Additionally, vertical frame members 115, 120 may extend the full height of semi-tractor trailer 15.

Drivers hauling semi-tractor trailers often work alone, such that it is advantageous that a single person be able to install drag reducing system 10. In the illustrated embodiment, drag reducing system 10 is configured such that a single person may install the selectively removable frame 100 on semi-tractor trailer 15. In one implementation, a single person may install selectively removable frame 100 because selectively removable frame 100 is made of lightweight materials. For example, selectively removable frame 100 may be made of a lightweight metallic, composite, or polymeric material. Representative materials that can be used include, but are not limited to: aluminum, carbon fiber, fiberglass, high-density polyethylene (HDPE), and/or polyacrylate. In still another embodiment, selectively removable frame 100 is made of rectangular tubing. The tubing may similarly be made of a metal (including aluminum and steel), or from composite, or polymer materials.

In an exemplary embodiment, selectively removable frame 100 includes a plurality hinge plates 405. For example, in the illustrated embodiment, selectively removable frame 100 has four hinge plates 405. In this embodiment, hinge plates 405 are located on vertical frame members 115, 120, and each include one or more hinge pin holes 410. As is discussed in more detail with reference to FIG. 8, hinge plates 405 are, in some embodiments, features of a connecting assembly 400 which may be used to removably couple drag reduction member 300 to selectively removable frame 100.

FIG. 2 further depicts an exemplary embodiment in which selectively removable frame 100 is used in connection with securement assembly 200. As noted, securement assembly 200 is configured to couple drag reducing system 10 to semi-tractor trailer 15. In the illustrated embodiment, a person installing drag reducing system 10 can use securement assembly 200 to first secure selectively removable frame 100 to semi-tractor trailer 15. Various methods of securing selectively removable frame 100 to semi-tractor trailer 15 are contemplated and within the scope of the present invention. For example, screws, brackets, clamps, magnets, suction cups, rubber high-friction surfaces, temporary adhesives, hook and loop fasteners, resilient cords, nylon strapping, rope, tension springs, and come-alongs are representative of specific devices which may be used to couple selectively removable frame 100 to semi-tractor trailer 15. Alternatively, securement assembly 200 includes, for example, adjustment assembly 205 and securing mechanism 250, exemplary embodiments of which described more fully with reference to FIGS. 3 through 5.

Figure 3:
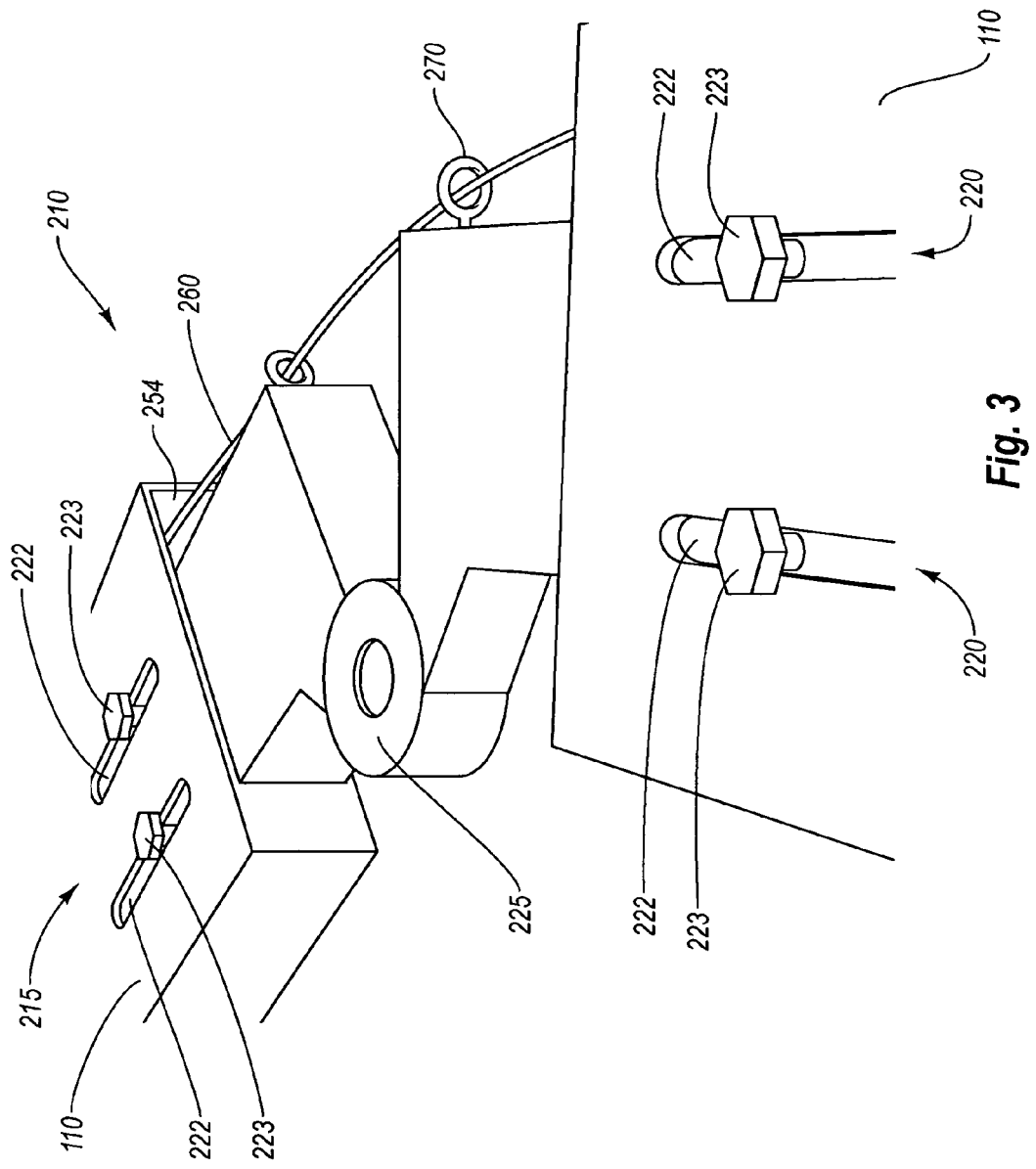
FIG. 3 is a top, perspective view of an adjustment assembly located on a horizontal frame member, according to one embodiment of the present invention.

FIG. 3 illustrates at least a portion of an adjustment assembly 205 which may be used, according to one embodiment, with securement assembly 200. In this embodiment, adjustment assembly 205 is adapted to allow an installer of drag reducing system 10 to adjust horizontal frame member 110 to fit the width of semi-tractor trailer 15. In the illustrated embodiment, adjustment assembly 205 expands and retracts by utilizing telescoping adjustable joint assembly 210. Telescoping adjustable joint assembly 210 is linked, in part, to horizontal frame member 110, and has a plurality of telescoping mechanisms. In this embodiment, telescoping adjustable joint assembly 210 includes a first telescoping mechanism 215 linked to horizontal frame member 110, and a second telescoping mechanism 220 linked to horizontal frame member 110.

In this embodiment, telescoping mechanisms 215 and 220 comprise slots 222 and pins 223. In this embodiment, pins 223 are bolts which are positioned within slots 222 and are threaded into horizontal frame member 110. In this manner, slots 222 receive at least a portion of pins 223, while also allowing pins 223 to slide along at least a portion of slots 222. Slots 222 define, in part, the path in which pins 223 and horizontal frame member 110 can move. Slots 222 can be substantially horizontal and parallel to horizontal frame member 110. Accordingly, as pins 223 move along slots 222, pins 223 maintain the horizontal position of at least a portion of horizontal frame member 110, while also allowing horizontal frame member 110 to extend or retract in a horizontal direction by following slots 222. As noted, telescoping mechanisms 215 and 220 provide various advantages. For example, where slots 222 and pins 223 allow horizontal extension and retraction of horizontal frame member 110, selectively removable frame 100 can be adjusted to accommodate the widths of various land vehicles.

Although the illustrated embodiment of adjustment assembly 205 depicts substantially identical telescoping mechanisms 215 and 220, it will be appreciated by a person having ordinary skill in the art that first telescoping mechanism 215 may be different than second telescoping mechanism 220. Indeed, in some implementations of the present invention, second telescoping mechanism 220 may be omitted. In still other embodiments, telescoping mechanisms 215 and 220 have different numbers and or lengths or slots 222 and/or pins 223, or are otherwise different.

Telescoping adjustable joint assembly 210 can include at least one hinge 225. In an exemplary embodiment, hinge 225 is positioned approximately in the center of horizontal frame 110, and between telescoping mechanisms 215 and 220. Hinge 225 is desirable for many reasons. For example, hinge 225 can allow horizontal frame member 110 to bend. When in a center position, hinge 225 allows horizontal frame member 110 to be folded in half along a vertical axis.

As a result, when horizontal frame member 110 is folded in half, the size of selectively removable frame 100 is reduced, thus allowing for more compact storage of drag reducing system 10. This is particularly advantageous when drag reducing system 10 is not in use, and can allow a user to store drag reducing system 10 in a land vehicle. Additionally, this folding feature can simplify removal and/or attachment of drag reducing system 10, such that it facilitates handling of drag reducing system 10 by a single installer. It will be appreciated by a person of ordinary skill in the art that hinge 225 is only one example of a pivotal joint that may be used in connection with the present invention. Additionally, it is not necessary, in some embodiments, that hinge 225 or other joints be included on selectively removable frame 100, or that selectively removable frame 100 be foldable.

With continued reference to FIG. 3, an exemplary embodiment of adjustment assembly can include a cable 260. Cable 260 passes through an inner channel 254 in horizontal frame member 110, and through telescoping adjustable joint assembly 210. As will be discussed in more detail below, cable 260 can, in some implementations of the invention, assist a user of drag reducing system 10 in expanding or retracting selectively removable frame 100 to fit on land vehicle. For example, the use of cable 260 may be used to drive the movement of bolts 223 along slots 222, and to fit selectively removable frame 100 to the width of the land vehicle. In such implementations, it may be desirable that cable 260 be allowed to slide within internal channel 254, to avoid cable 260 being pinched by hinge 225 and/or telescoping adjustable joint assembly 210.

Accordingly, in this embodiment, telescoping joint assembly 205 includes eye-hooks 270 which receive cable 260. Eye hooks 270 position cable 260 away from hinge 225, thus reducing the risk that cable 260 will be pinched as hinge 225 closes. Although the embodiment illustrated in FIG. 3 and the foregoing discussion are directed to the use of telescoping adjustable joint assembly 210 with horizontal frame member 110, it will be appreciated that this embodiment is not limiting. For example, it is contemplated that telescoping adjustable joint assembly 210 can be applied equally to one or more vertical frame members 115, 120, or that vertical frame members 115, 120 be otherwise adapted to have joints such that they can be folded.

Figure 4:
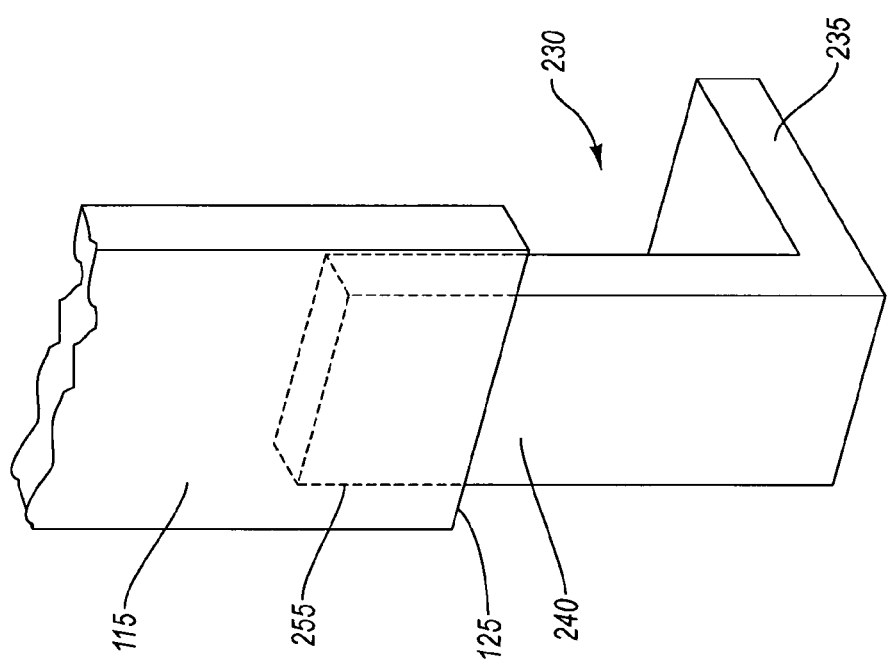
FIG. 4 is a frontal, perspective view illustrating an adjustment assembly located on a vertical frame member, according to one embodiment of the present invention.

FIG. 4 illustrates an embodiment of the present invention in which adjustment assembly 205 is configured to adapt the vertical height of selectively removable frame 100. In the illustrated embodiment, adjustment assembly 205 includes a telescoping securement member 230. Telescoping securement member 230 is slideably coupled to the bottom end of a vertical frame member such as first vertical frame member 115, such that telescoping securement member 230 may be used to adjust the height of selectively removable frame 100.

In the illustrated embodiment, telescoping securement member 230 is substantially "L" shaped such that it includes a horizontal foot portion 235 which is coupled to, and substantially perpendicular to a vertical foot portion 240. This configuration is advantageous for various reasons. For example, horizontal foot portion 235 can fit on the underside of a rectangular semi-tractor trailer 15. Vertical foot portion 240 may be slideably coupled to first vertical frame member 115 in a manner that allows the position of vertical foot portion 240 to be adjusted. As a result, where first vertical frame member 115 does not extend along the full side of semi-tractor trailer 15, vertical foot portion 240 can be selectively positioned to extend the remaining distance. In this manner, vertical foot portion 240 facilitates the close fit of selectively removable frame 100 to semi-tractor trailer 15.

In this embodiment, vertical frame member 115 includes an internal channel 255 to allow telescoping securement member 230 to be slideably received within and coupled to first vertical frame member 115. Internal channel 255 is in communication with ambient at a distal end 125 of first vertical frame member 115. In this manner, vertical foot portion 240 can be selectively inserted within internal channel 255, so as to define the vertical height of selectively removable frame 100, and thereby allow selectively removable frame 100 to be adapted to the height of semi-tractor trailer 15. To form channel 255, first vertical frame member 115 may be made of rectangular tubing, or a channel may otherwise be milled or drilled into distal end 125 of first vertical frame member 115.

In another embodiment, a cord or cable is used to connect first vertical frame member 115 to telescoping securement member 230. A connection between first vertical frame member 115 and telescoping securement member 230 can reduce the chance that telescoping securement member 230 will be misplaced. This is particularly the case when securing mechanism 250 is not engaged. In particular, when securing mechanism 250 is not engaged, telescoping securement member 230 may be removed from internal channel 255, but the cord or cable keeps telescoping securement member 230 with selectively removable frame 100. In one embodiment, the cord or cable is resilient. When securing mechanism 250 is engaged, the resilient cord or cable helps position vertical foot member 240 within channel 255, and continues pulling telescoping securement mechanism 250 until horizontal foot member 235 contacts the bottom of semi-tractor trailer 15.

Telescoping securement member 230 may be made of any number of suitable materials. For example, telescoping securement member 230 may be made from steel or aluminum, or from any other suitably durable metal, composite, or polymer. In one embodiment, telescoping securement member 230 is made of the same material as first vertical frame member 115. Preferably, telescoping securement member 230 is formed of a solid material and does not comprise tubing. A particular feature of solid telescoping securement member 230 is improved strength. Solid materials generally provide greater strength than hollow materials of the same type, thus also providing improved failure resistance when telescoping securement member 230 is secured against the underside of semi-tractor trailer 15.

For simplicity, the embodiment illustrated in FIG. 4 depicts telescoping securement member 230 only in connection with first vertical frame member 115. It will be appreciated, however, that telescoping securement member 230 may also be used with second vertical frame member 120. In particular, it is advantageous to use a multiple telescoping securement member 230 in connection with both vertical frame members 115, 120, so as to allow selectively removable frame 100 to be vertically adjusted on both sides, and to easily accommodate a rectangular semi-truck trailer.

Figure 5:
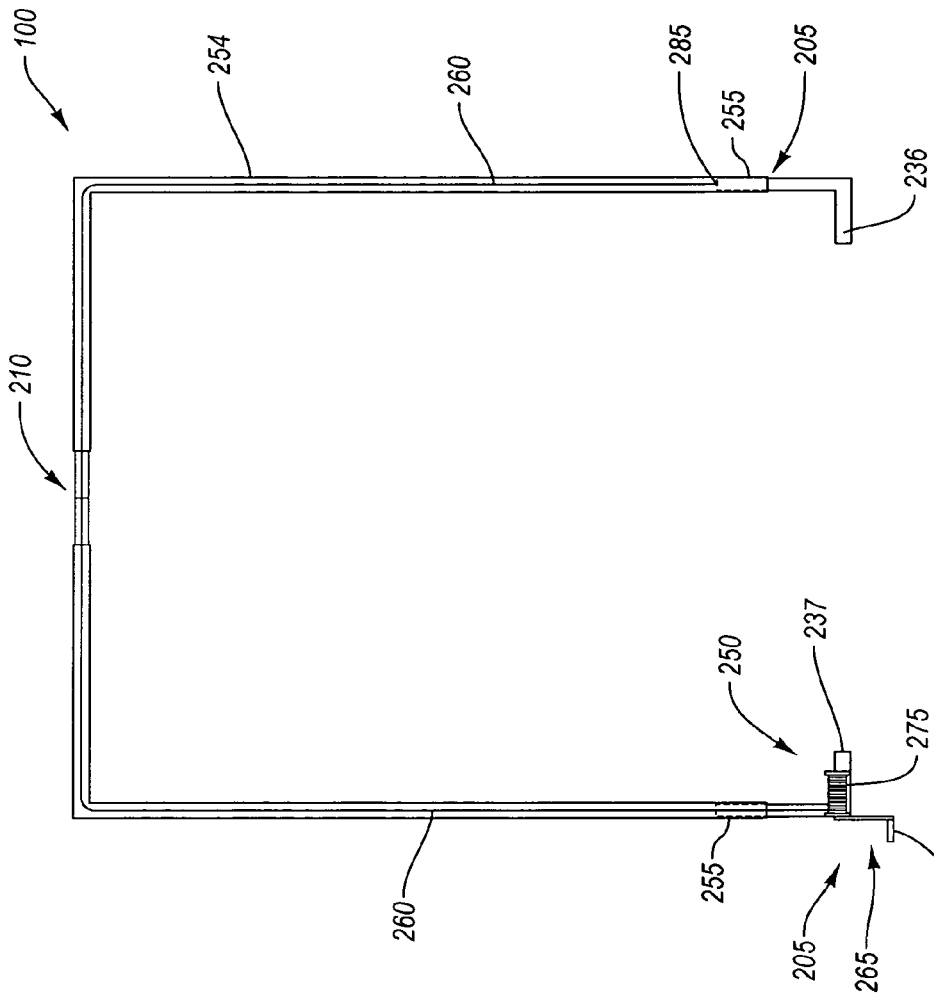
FIG. 5 is a frontal view of a selectively removable frame and securing mechanism according to one embodiment of the present invention.

FIG. 5 is a frontal view of selectively removable frame 100 and illustrates a securement assembly 200 that includes an exemplary embodiment of securing mechanism 250 for selectively securing selectively removable frame 100 to land vehicle 5. In the illustrated embodiment, securing mechanism further includes a winch mechanism 265 for use with cable 260. In one aspect, the use of winch mechanism 265 with cable 260 allows a single person to position and secure selectively removable frame 100 to land vehicle 5.

In an exemplary embodiment, winch mechanism 265 further includes a spool 275 and a ratcheting handle 280 to be used with cable 260. One end of cable 260 can be secured to a point 285 on first foot member 236. In this embodiment, cable 260 is received by internal channel 255 which also receives first foot member 236. Additionally, cable 260 runs through internal channel 254, which houses cable 260 along vertical frame members 115, 120, and along horizontal frame member 110. Preferably, internal channel 254 is in communication with internal channel 255 to as to allow cable 260 to easily slide inside selectively removable frame 100. Although the figures depict internal channel 254 as running through substantially all of selectively removable frame 100, this feature is not necessarily limiting. For example, cable 260 need not be enclosed within selectively removable frame 100 and/or an internal channel. For example, cable 260 can run along the exterior of selectively removable frame 100, or, in alternative embodiments, may run directly from winch mechanism 265 to point 285.

The opposing end of cable 260 can be secured to spool 275 of winch mechanism 265. Spool 275 is further secured to second foot member 237. Accordingly, securing cable 260 is also effectively secured to second foot member 237. In one implementation, ratcheting handle 280 is operatively coupled to spool 275. Additionally, ratcheting handle 280 can extend away from second foot member 237 and/or spool 275. In this manner, a person installing drag reducing system 10 can manually rotate ratcheting handle 280 to create a corresponding rotation of spool 275. In one aspect, as spool 280 rotates cable 260 is tightened (i.e. the amount of cable 260 housed on spool 275 is increased).

In one embodiment, tightening cable 260 adjusts the size and/or shape of selectively removable frame 100 so as to fit tightly against land vehicle 5. As cable 260 is tightened, cable 260 pulls on point 285 and moves first foot member 236 in an upward direction. Additionally, where selectively removable frame 100 is positioned around a rectangular land vehicle 5, such as semi-tractor trailer 15, tightening cable 260 can also raise second foot member 237. In this manner, cable 260 can move first foot member 236 and second foot member 237 to a position that is in contact with the underside of semi-tractor trailer 15.

When winch mechanism 265 is not engaged, cable 260 can be loose. When loose, cable 265 allows foot members 236 and 237, and telescoping adjustable joint assembly 210 to move freely. As a result, an installer can easily and efficiently adjust position horizontal frame member 110 and vertical frame members 115, 120 so that they are loosely fitted around semi-tractor trailer 15. A selectively loose fit is advantageous for various reasons. For example, where only a single person is available to install selectively removable frame 100 and drag reducing system 10, a loose fit allows the installer to easily position selectively removable frame 100 on the semi-tractor trailer. As a result, a single person can easily install drag reducing system 10.

In an exemplary embodiment, winch mechanism 265 is engaged when ratcheting handle 280 is rotated. By rotating ratcheting handle 280, winch mechanism engages, and the tension on cable 260 increases. As noted, telescoping securement members 230, such as first foot member 236 and second foot member 237 can adjust the vertical height of selectively removable frame 100. Additionally, the increased tension on cable 260 can adjust telescoping adjustable joint assembly 210. The tension on cable 260 can pull on telescoping mechanisms 215 and 220, to reduce the width of selectively removable frame 100, and thereby retract selectively removable frame 100 to the width of semi-tractor trailer 15. In this manner, horizontal frame member 110 and vertical frame members 115, 120 can both conform to the shape of semi-tractor trailer 15. As a result, when winch mechanism 265 is completely engaged, 265 secures selectively removable frame 100 to semi-tractor trailer 15 through a tight, frictional fit between selectively removable frame 100 and semi-tractor trailer 15. A frictional fit provides various additional advantages. For example, a frictional fit does not require that any permanent modifications be made to semi-tractor trailer 15. As a result, the owner of a trailer may not object to the use of drag reducing system 10 and selectively removable frame 100, and the driver of the semi-tractor trailer may realize various fuel economy benefits resulting from drag reducing system 10.

Although the foregoing description describes the use of securing mechanism 250 to adjust telescoping adjustable joint assembly 210, first foot member 236, and second foot member 237, this is not necessary in all embodiments of the present invention. In some embodiments, two or fewer members or assemblies may be adjusted. For example, in some embodiments selectively removable frame 100 may not have a telescoping adjustable joint assembly 210, such that only first foot member 236 and/or second foot member 237 are adjusted by securing mechanism 250.

With continued reference to FIG. 5, securement assembly 200 may further provide a biasing mechanism. Particularly after selectively removable frame 100 has been secured to semi-tractor trailer 15, it is desirable that a biasing mechanism hold selectively removable frame 100 in position. If allowed to loosen, selectively removable frame 100 could potentially fall off semi-tractor trailer 15, thus causing semi-tractor trailer to experience additional drag forces, while also resulting in loss of and/or damage to drag reducing system 10. In this embodiment, ratcheting handle 280 can further act as the biasing mechanism. Once winch mechanism 265 is engaged, and an installer has secured selectively removable frame 100 in place, ratcheting handle 280 can resist motion on spool 275 that would result in loosening cable 260. In this manner, cable 260 maintains its tension, and telescoping adjustable joint assembly 210, first foot member 236, and second foot member 237 are securely maintained in their tightened positions.

Figure 6:
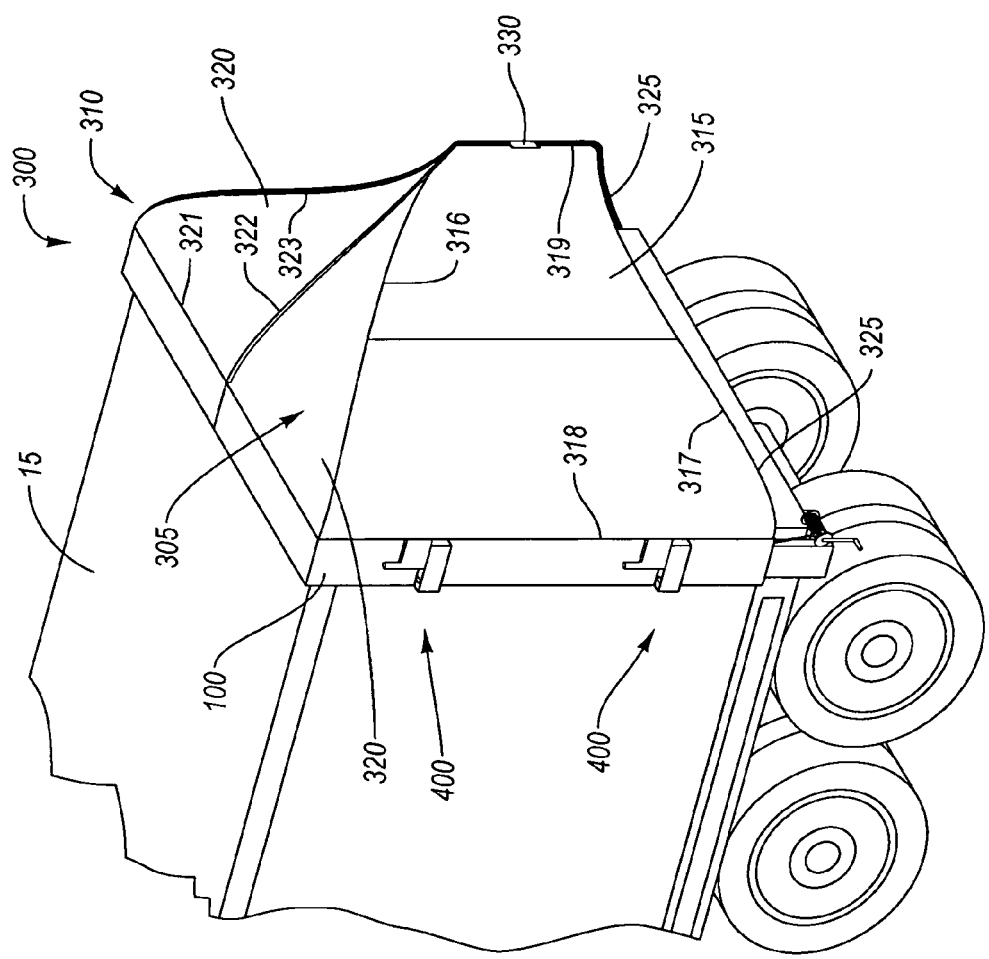
FIG. 6 is a perspective view illustrating a drag reduction member according to one embodiment of the present invention.

FIG. 6 illustrates an exemplary embodiment of a drag reducing system 10 which includes, in part, drag reduction member 300 in combination with selectively removable frame 100. In the illustrated embodiment, drag reduction member 300 is formed by two, substantially identical fairing members 305 and 310. Further, each fairing member includes a top member 320, a bottom member 325, and a side member 315. A feature of some embodiments which incorporate fairing members 305 and 310 having top member 320, bottom member 325, and side member 315 is that drag reduction member 300 can be detached from selectively removable frame 100 so as to allow quick and easy installation by a single person, and to facilitate storage of drag reducing system 10.

In the illustrated embodiment, top member 320 and bottom member 325 are each connected to, and thereby connected to each other, by side member 315. In some embodiments, top member 320 and bottom member 325 can further have a leading edge 321 and a side edge 323. Although it is not necessarily required, leading edge 321 can abut selectively removable frame 100 or semi-tractor trailer 15. Accordingly, as air flows over semi-tractor trailer 15, the air will reach the back end and can first flow over leading edge 321 of top member 320.

In the illustrated embodiment, side edges 323 are formed at the connection between side member 315 and top member 320 and/or bottom member 325. In this manner, side edges 323 may also form an upper edge 316 and/or a lower edge 317 on side member 315. In the illustrated embodiment, side edges 323 correspond to upper edge 316 and lower edge 317. As will be appreciated by a person having ordinary skill in the art, however, other embodiments are contemplated where side edges 323 are separate from upper edge 316 and/or lower edge 317.

Side members 315 can also include a leading edge 318 and/or a trailing edge 319. In the illustrated embodiment, leading edge 318 is secured near the side surface at the back end of semi-tractor trailer 15 and selectively removable frame 100. In this manner, once the air flows along the side of semi-tractor trailer 15, it will then flow past leading edge 318 of side member 315. Further, as illustrated, side member 315 can then direct the air flow along the surface of side member 315 and toward trailing edge 319.

Preferably, top member 320 and bottom member 325 are flexible. As will become more clear in the description given with reference to FIG. 7B, some embodiments of drag reduction member 300 are configured to collapse so as to allow for easy storage of drag reducing system 10. In such embodiments, top member 320 and bottom member 325 can be permitted to flex and bend to accommodate collapse of drag reduction member 300. In one implementation of the invention, top member 320 and bottom member 325 are also lightweight so as to allow one person to easily lift and install drag reduction member 300. For example, top member 320 and/or bottom member 325 may be formed of a lightweight fabric. Representative fabrics which may be used include, for example, nylon, stretched canvas, or a waterproof fabric. In other embodiments, a plastic or rubber can be used. For example, a polyester film such as Mylar or Teijin, is representative of one material which can be used with the present invention.

Side members 315, however, are preferably made from a material that provides structural strength to facilitate handling of drag reduction member 300 during installation, while also being lightweight so as to allow a single person to install drag reduction member 300 and drag reducing system 10. Preferably, side members 315 are made of a fiberglass composite. Fiberglass composites are readily available and can feature a cost savings over other possible materials. In other implementations of the invention, however, other materials are used. Representative alternative materials include, for example, carbon fiber composites, stretched canvas, nylon, steel, or aluminum.

FIG. 6 also illustrates the possible use of a coupling mechanism 330 in connection with drag reduction member 300. In the illustrated embodiment, coupling mechanism 330 is positioned on, and removably fastened to, trailing edges 319 of side members 315. Removably fastening coupling mechanism 330 to drag reduction member 300 provides numerous advantages. For example, coupling mechanism 330 may be used to hold fairing members 305 and 310 in place, so as to reduce drag on semi-tractor trailer 15. Additionally, where coupling mechanism 330 is removable, it can be disengaged so as to allow fairing members 305 and 310 to collapse for removal and storage.

In an exemplary embodiment, coupling mechanism 330 is a resilient clip which flexes to fit around fairing members 305 and 310, and snaps into place, thereby removably securing fairing members 305 and 310 in place. In an alternative embodiment, coupling mechanism 330 can include a sleeve which slideably engages fairing members 305 and 310. In still other embodiments, coupling mechanism 330 can include a bracket, bolt assembly, clamps, or other coupling devices. In still other alternative embodiments, coupling mechanism can permanently secure fairing members 305 and 310. For example, coupling mechanism 330 may be one or more welds, rivets, or adhesives that permanently fasten trailing edges 319 of fairing members 305 and 310. While the illustrated embodiment generally depicts coupling mechanism 330 being attached to trailing edges 310 of side members 315, it will be appreciated that coupling mechanism 330 can attach to other sections of drag reduction member 300. For example, it is contemplated that coupling mechanism could be coupled to coupling edges 322, to side members 315, or to top and bottom members 320 and 325.

With continued reference to FIG. 6, the illustrated drag reducing system 10 can further include connecting assembly 400. In this exemplary embodiment, connecting assembly 400 is used to removably fasten drag reduction member 300 to selectively removable frame 100. In this manner, when selectively removable frame 100 is fixed to semi-tractor trailer 15, connecting assembly 400 can also fasten drag reduction member 300 to semi-tractor trailer 15. As is discussed in more detail with reference to FIG. 8, a variety of techniques and mechanisms may be used to form connecting assembly 400. For example, hinge pins 415 can be positioned on drag reduction member 300, and may be positioned within one or more hinge pin holes 410 contained within hinge plates 405.

As illustrated in FIG. 6, and as more fully illustrated in FIGS. 7a and 7b, side members 315 can taper between leading edge 318 and trailing edge 319. In one embodiment, side members 315 are configured to improve aerodynamic efficiency. For example, the tapered surface(s) of side members 315 can be curved to improve fluid flow around drag reduction member 300.

FIG. 7a illustrates a top view of the shape of side members 315 according to one embodiment of the present invention in which side members 315 are configured to improve aerodynamic efficiency. In the illustrated embodiment, side members 315 are rounded as they taper from leading edge 318 to trailing edge 319. For example, side members 315 can have a convex section 335 and/or a concave section 340. In one implementation, convex section 335 is formed near leading edge 318 and is followed by concave section 340, such that concave section is nearer trailing edge 319. In other embodiments, concave section 340 may be nearer leading edge 318. Further, in other embodiments, side member 315 does not have convex section 335 and/or concave section 340. Alternatively, only a single convex section 335 or concave section 340 may be included in side member 315, or, further still, multiple convex sections 335 and/or concave sections 340 can be formed in each side member 315.

In the illustrated embodiment, coupling edges 322 are curved, such that when drag reduction member 300 is in position to reduce drag on semi-tractor trailer 15, fairing members 305 and 310 at least partially overlap. In the illustrated embodiment, coupling edges 322 overlap along the entire distance between leading edge 318 and trailing edge 319. While these features are not necessarily limiting of the present invention, an overlap between fairing members 305 and 310 provides various advantages. For example, when overlapped, fairing members 310 create a continuous surface generally parallel to top member 320. The continuous surface can improve air flow around drag reduction member 300 and thereby can reduce drag on semi-tractor trailer 15. As will be appreciated by a person of ordinary skill in the art, however, this feature is not necessarily limiting. For example, it is contemplated that other embodiments, fairing members 305 and 310 do not overlap, or only partially overlap such that only a partially continuous surface is formed.

As illustrated in FIG. 7b, drag reduction member 300 can also be configured to be collapsible. In the illustrated embodiment, side members 315 of fairing members 305 and 310 can be folded along a vertical axis. For example, in the illustrated embodiment, fairing member 310 is in an operative position, but may be folded along a vertical axis 350. Fairing member 305 can be at least partially collapsed. As seen in FIG. 7b, where fairing member 305 is in a partially collapsed position, side member 315 of fairing member 315 can be at least partially folded along the vertical axis 350.

In some implementations of the present invention, side members 315 are configured to fold substantially in half. For example, in the embodiment illustrated in FIG. 7b, convex section 335 substantially matches concave section 340, and coupling edges 322 are curved. Accordingly, when side member 315 is folded along vertical axis 350, concave section 340 may be positioned substantially around convex section 335. In this manner, drag reduction member 300 has a folding feature which, in one embodiment, allows fairing members 305 and 315 to be collapsed and to facilitate storage when not in use. In FIG. 7c, fairing members 305, 310 are folded to a completely collapsed position and rotated forward to lie along the side of trailer 15. In this manner, fairing members 305, 310 have been moved to completely expose the rear of trailer 15, thereby allowing access to load or unload trailer 15. Additionally, because fairing members 305 and 310 are lightweight, drag reduction member 300 can be folded, removed, and/or attached by a single person.

While the embodiments illustrated in FIGS. 7b and 7c are exemplary of one implementation of the present invention, it will generally be appreciated by a person having ordinary skill in the art that invention may have additional or other features. For example, in some implementations, side members 315 fold along a horizontal axis, or otherwise do not fold along a vertical axis. In still other embodiments, side members 315 do not taper.

Figure 8:
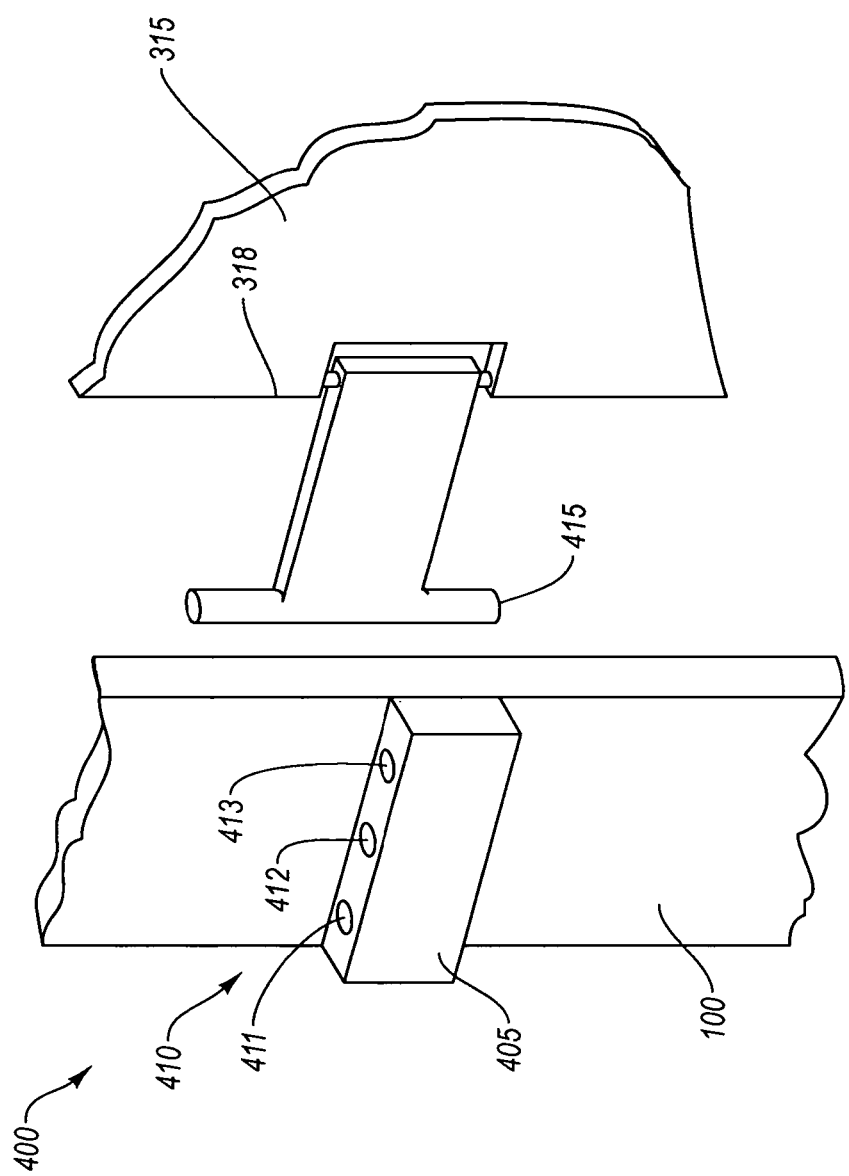
FIG. 8 is a close-up, perspective view of a connecting assembly for coupling the drag reduction member to the selectively removable frame, according to one embodiment of the present invention.

FIG. 8 illustrates an exemplary embodiment of connecting assembly 400, which can be used to removably secure drag reduction member 300 to selectively removable frame 100. As previously noted, a variety of mechanisms may be used to connect selectively removable frame 100 and drag reduction member 300. In one exemplary embodiment, connecting assembly 400 has one or more hinge plates 405 located on selectively removable frame 100, and one or more hinge pins 415 on drag reduction member 300. A feature of the illustrated hinge assembly is that drag reduction member 300 may be removably secured to selectively removable frame 100 so as to facilitate storage of drag reduction member 300 when drag reducing system 10 is not in use.

In the illustrated embodiment, hinge plate 405 can be secured to vertical frame members 115, 120. Further, hinge plate 405 includes one ore more hinge pin holes 410. Hinge pin holes 410 can be configured to receive one or more hinge pins 415 which are operatively coupled to drag reduction member 300. For example, in the illustrated embodiment, hinge pin 415 is operatively coupled to leading edge 318 of side member 315. The illustrated provides various advantages, including, for example, quick and easy installation and/or removal of drag reduction member 300.

As depicted in the embodiment illustrated in FIG. 8, hinge pin 415 may be inserted into, and received by, any hinge pin hole 410. Preferably, hinge pin holes 410 have a diameter slightly larger than the diameter of hinge pin 415. In this manner, a person can install drag reduction member 300 by placing hinge pin 415 within hinge pin hole 410, and without any requirement to force hinge pin 415 into, and create an interference fit with, hinge pin hole 410. Similarly, drag reduction member 300 can be removed by simply lifting hinge pin 415 out of hinge pin hole 410.

The illustrated embodiment further allows an installer to adjust the position of drag reduction member 300 so as to accommodate a semi-tractor trailer 15 that has additional hardware attached to its back end. As shown in FIG. 8, hinge plates 405 can include a first hinge pin hole 411, a second hinge pin hole 412, and a third hinge pin hole 413. Hinge pin 415 can be fitted within, and rotably engaged by, any of the hinge pin holes 410.

In one embodiment, hinge pin holes 410 are spaced approximately two inches apart from center to center. Accordingly, in some embodiments, when hinge pin 415 is engaged by first hinge pin hole 411, drag reduction member 300 can be positioned to be substantially flush with the back-end of semi-tractor trailer 15. When second hinge pin hole 412 receives hinge pin, drag reduction member 300 is positioned approximately two inches from the back-end of semi-tractor trailer 15. Similarly, when third hinge pin hole 413 receives hinge pin 415, drag reduction member 300 is positioned approximately four inches from the back-end of semi-tractor trailer 15. In this manner, connecting assembly 400 allows the distance between drag reduction member 300 and semi-tractor trailer 15 to be selectively varied. This can be important where, for example, semi-tractor trailer 15 has hardware that protrudes from its back-end, and which interferes with a flush fit of drag reducing system 10 on the back of semi-tractor trailer 15.

As will be appreciated by one having ordinary skill in the art, the embodiment depicted in FIG. 8 is exemplary only, and not necessarily limiting. For example, other embodiments are contemplated in which more or fewer than three hinge ping holes 410 are used. Alternatively, spacing between hinge pin holes may be greater or less than two inches.

A hinge connector such as that illustrated in FIG. 8 can further allow an installer to selectively place drag reduction member 300 in one of at least two positions on the back-end of semi-tractor trailer 15. As illustrated, hinge pin 415 contains a lower and upper portion, each of which may be fitted into hinge pin hole 410. This allows drag reduction member 300 and/or fairing members 305 and 310 to be flipped and used on either side of semi-tractor trailer 15. In one embodiment, hinge plates 405 and hinge pins 415 are configured so as to allow fairing members 305 and 310 to be positioned in a first position. In a preferred embodiment, the first position of fairing members 305 and 310 is such that the top of drag reduction member 300 is substantially flush with the top of semi-tractor trailer 15. Additionally, in the first position, drag reduction member 300 can be positioned flush with, or above the bottom of semi-tractor trailer 15. In one implementation, drag reduction member 300 is positioned approximately four inches above the bottom of semi-tractor trailer 15.

In a second position, drag reduction member 300 can be turned upside down such that drag reduction member 300 is flush with the bottom of semi-tractor trailer 15. Additionally, in this second position, drag reduction member 300 can be flush with or below the top of semi-tractor trailer 15, while it is preferred that drag reduction member 300 be positioned approximately four inches below the top of semi-tractor trailer 15. The first and second positions of drag reduction member 300 are advantageous for many semi-tractor trailers. For example, a trailer usually has tail lights, brake lights, turn signals, and the like positioned on the top or bottom of the trailer. Frequently, these lights are within about four inches from the top or bottom of the trailer. By allowing drag reduction member 300 to be flipped, such that drag reduction member 300 is not flush with at least one of the top and bottom of semi-tractor trailer 15, drag reduction member 300 can allow the lights on semi-tractor trailer 15 to be visible, regardless of whether they are positioned near the top or bottom of semi-tractor trailer 15.

It will be appreciated, however, that it is not necessary that drag reduction member 300 have first and second positions, or that drag reduction member 300 be sized to allow any lights on semi-tractor trailer 15 to be visible. In other implementations, drag reduction member 300 fits flush against the top and bottom of semi-tractor trailer 15, or otherwise covers the lights. In some embodiments, top member 320 and/or bottom member 325 are transparent, such that motorists to the rear of semi-tractor trailer 15 can see any lights through drag reducing system 10. In still other alternative embodiments, fairing members 305 and 310 include a redundant set of lights.

Figure 9:
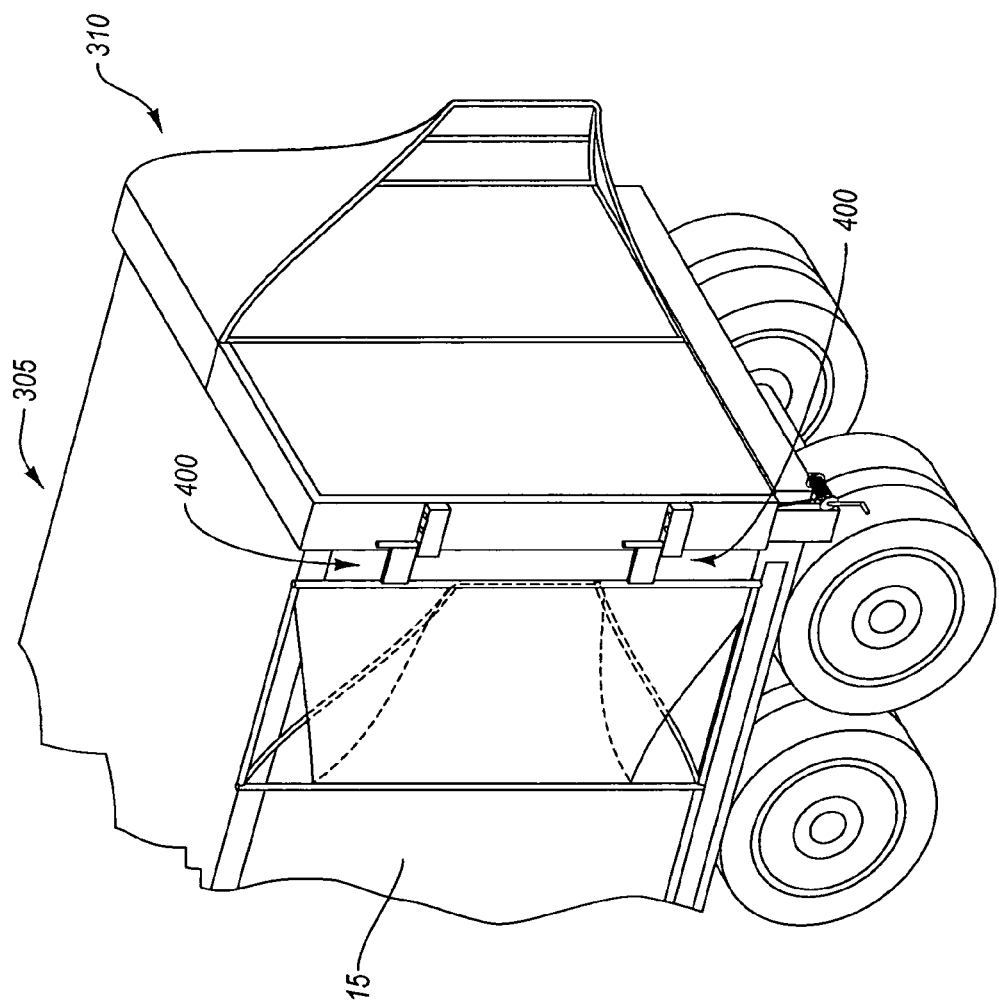
FIG. 9 is a perspective view of a drag reducing system, and illustrating the pivoting ability of a coupling mechanism according to one embodiment of the present invention.

A hinge such as that depicted in FIG. 8 further provides the advantage that drag reduction member 300 can be rotated without disengaging connecting assembly 400. FIG. 9 illustrates this feature of the exemplary embodiment. For example, as hinge pins 415 can be rotably engaged by hinge pin holes 410, they can be rotated to multiple positions, such as, that in the illustrated embodiment.

As illustrated, by rotating drag reduction member 300 to the side of semi-tractor trailer 15, the back end of semi-tractor trailer 15 can regain its squared-off shape. In this manner, drag reduction member 300 can be rotated to the sides of semi-tractor trailer 15, and the doors on semi-tractor trailer 15 can then be opened and closed without obstruction. Another particular benefit of rotating drag reduction member 300 is that semi-tractor trailer 15 can be backed-up flush against a loading dock without removing drag reduction member 300 and/or drag reducing system 10.

As further illustrated, drag reducing system 10 can combine a collapsible drag reduction member 300 with a rotational connecting assembly 400. While this is not a necessary combination, this further allows drag reduction member 300 to be rotated to the sides of semi-tractor trailer 15 to allow access to the doors and/or a loading dock, while reducing the width of drag reduction member 300 that protrudes from the side of semi-tractor trailer 15.

The present invention may be embodied in other specific forms without departing from its spirit or essential characteristics. The described embodiments are to be considered in all respects only as illustrative and not restrictive. The advantages listed as a part of the embodiments described are not necessary to fall within the scope of this invention. The scope of the invention is, therefore, indicated by the claims rather than by the foregoing description. All changes which come within the meaning and range of equivalency of the claims are to be embraced within their scope.

The invention claimed is:

1. An aerodynamic drag reducing apparatus comprising:
 a selectively removable frame adapted to be retrofitted to a semi-tractor trailer;
 a securement assembly adapted to secure the selectively removable frame to a semi-tractor trailer, such that the selectively removable frame is secured to the semi-tractor trailer without making permanent modifications to the semi-tractor trailer; and a drag reducing member removably linked to the selectively removable frame comprising:
a first foldable fairing member pivotally linked to the frame;
a second foldable fairing member pivotally linked to the frame; and
a fairing coupling member configured to secure the first foldable fairing member to the second foldable fairing member to form the drag reducing member.

2. The apparatus as recited in claim 1, wherein the selectively removable frame comprises a plurality of frame members and an adjustment assembly linked to at least one of the plurality of frame members, such that the selectively removable frame is adapted to adjust to at least one of: (i) the width of a land vehicle; and (ii) the height of a land vehicle.

3. The apparatus as recited in claim 1, wherein the first and second foldable fairing members are foldable along a vertical axis, wherein the first and second foldable fairing members have upper and lower edges, and leading and trailing edges, wherein the leading edges are linked to the frame and the fairing coupling member is located at said trailing edges.

4. The apparatus as recited in claim 3, wherein the drag reduction member further comprises:
a flexible top member having a leading edge, a coupling edge and a side edge, wherein the side edge is coupled to the upper edges of the first and second foldable fairing members; and
a flexible bottom member having a leading edge, a coupling edge and a side edge, wherein the side edge of the flexible bottom member is coupled to the lower edges of the first and second foldable fairing members.

5. The apparatus as recited in claim 1, wherein the position of the drag reduction member is adjustable vertically on the selectively removable frame such that the position of the drag reduction member can be modified to fit more than one semi-tractor trailer in a way that allows the lights on the semi-tractor trailer to be visible.

6. The apparatus as recited in claim 1, wherein the first and second foldable fairing members can be rotated so as to completely unobstruct the rear face of the semi-tractor trailer.

7. The apparatus as recited in claim 1, further comprising a connecting assembly, wherein the drag reducing member is removably linked to the selectively removable frame by the connecting assembly.

8. The apparatus as recited in claim 7, wherein the connecting assembly is configured to enable the first and second foldable fairing members to rotate so as to completely expose the rear face of the semi-tractor trailer thereby allowing a user to access the rear face of the semi-tractor trailer without obstruction from the aerodynamic drag reducing apparatus.

9. The apparatus as recited in claim 7, wherein the connecting assembly enables the first and second foldable fairing members to be positionable toward and away from the rear face of the semi-tractor trailer.

10. The apparatus as recited in claim 9, wherein the drag reducing member comprises at least one hinge pin adjacent to the first foldable fairing member, and wherein the connecting assembly comprises two or more pin holes configured to receive the at least one hinge pin therein, wherein movement of the at least one hinge pin from a first pin hole to a second pin hole positions at least a portion of the first foldable fairing member away from the rear face of the semi-tractor trailer.

* * * * *

UNITED STATES PATENT AND TRADEMARK OFFICE
CERTIFICATE OF CORRECTION

PATENT NO. : 7,207,620 B2
APPLICATION NO. : 11/209325
DATED : April 24, 2007
INVENTOR(S) : Cosgrove et al.

It is certified that error appears in the above-identified patent and that said Letters Patent is hereby corrected as shown below:

Column 4
Line 23, after "plurality" insert --of--

Column 6
Line 53, after "plurality" insert --of--

Column 11
Line 1, after "engaged," insert --winch mechanism--

Column 13
Line 6, change "310" to --319--
Line 67, after "that" insert --in--

Column 14
Line 23, change "315" to --310--

Column 15
Line 37, change "ping" to --pin--

Signed and Sealed this

Thirteenth Day of May, 2008

JON W. DUDAS
*Director of the United States Patent and Trademark Office*